United States Patent
Roh et al.

(10) Patent No.: US 8,914,063 B2
(45) Date of Patent: Dec. 16, 2014

(54) MOBILE TERMINAL EQUIPPED WITH MODE SETTING KEY AND METHOD OF CONTROLLING THE MOBILE TERMINAL

(75) Inventors: Hyeong Seok Roh, Seoul (KR); Kyung Lack Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 951 days.

(21) Appl. No.: 12/120,140

(22) Filed: May 13, 2008

(65) Prior Publication Data

US 2009/0082061 A1    Mar. 26, 2009

(30) Foreign Application Priority Data

May 15, 2007 (KR) .......................... 10-2007-0047312
Oct. 17, 2007 (KR) .......................... 10-2007-0104683

(51) Int. Cl.
*H04M 1/00* (2006.01)
*H04M 1/725* (2006.01)
*H04M 1/23* (2006.01)

(52) U.S. Cl.
CPC .......... *H04M 1/72563* (2013.01); *H04M 1/236* (2013.01); *H04M 2250/52* (2013.01); *H04M 2250/66* (2013.01)
USPC ..................................................... 455/556.1

(58) Field of Classification Search
CPC ........................... H04W 52/0209; H04B 10/27
USPC ..................................................... 455/550.1
See application file for complete search history.

(56) References Cited

U.S. PATENT DOCUMENTS

| | | | |
|---|---|---|---|
| 7,673,156 B1 * | 3/2010 | Nojima | 713/300 |
| 2004/0259590 A1 | 12/2004 | Middleton | |
| 2006/0197753 A1 * | 9/2006 | Hotelling | 345/173 |
| 2006/0259758 A1 | 11/2006 | Deng et al. | |
| 2007/0184858 A1 * | 8/2007 | Landschaft et al. | 455/466 |

FOREIGN PATENT DOCUMENTS

| | | |
|---|---|---|
| CN | 1816187 | 8/2006 |
| GB | 2410858 | 8/2005 |
| KR | 10-2002-0015884 | 3/2002 |
| KR | 1020040003222 | 1/2004 |
| KR | 10-2004-0080804 | 9/2004 |
| KR | 10-2005-0021925 | 3/2005 |
| KR | 1020050022641 | 3/2005 |
| KR | 10-2007-0054004 | 5/2007 |
| WO | 00/48188 | 8/2000 |

OTHER PUBLICATIONS

Korean Intellectual Property Office Application Serial No. 10-2007-0047312, Office Action dated Aug. 30, 2013, 4 pages.

(Continued)

*Primary Examiner* — Ankur Jain
(74) *Attorney, Agent, or Firm* — Lee, Hong, Degerman, Kang & Waimey (57) ABSTRACT

A mobile terminal equipped with a mode setting key and a method of controlling the mobile terminal are provided. The method includes providing a mode setting key for choosing an operating mode for the mobile terminal; placing the mobile terminal in an operating mode chosen by the mode setting key when the mode setting key is manipulated; and placing the mobile terminal in a standby mode regardless of the chosen operating mode when the mobile terminal is booted. Therefore, it is possible to place a mobile terminal in any operating mode chosen by a mode setting key and to automatically place the mobile terminal in a standby mode immediately after being booted, regardless of the operating mode chosen by the mode setting key.

12 Claims, 10 Drawing Sheets

(56) References Cited

OTHER PUBLICATIONS

European Patent Office Application Serial No. 08008935.2, Search Report dated Jul. 25, 2013, 6 pages.

Korean Intellectual Property Office Application Serial No. 10-2007-0047312, Notice of Allowance dated Feb. 27, 2014, 2 pages.

Korean Intellectual Property Office Application Serial No. 10-2007-0104683, Notice of Allowance dated Jan. 28, 2014, 2 pages.

\* cited by examiner

MOBILE TERMINAL EQUIPPED WITH MODE SETTING KEY AND METHOD OF CONTROLLING THE MOBILE TERMINAL

CROSS-REFERENCES TO RELATED APPLICATION

This application claims the benefit of Korean Application No. 2007-0047312, filed May 15, 2007 and No. 2007-0104683, filed Oct. 17, 2007 in the Korean Intellectual Property Office, the disclosure of which is incorporated herein by reference.

BACKGROUND OF THE INVENTION

1. Field of the Invention

The present invention relates to a mobile terminal and a method of controlling the mobile terminal, and more particularly, to a mobile terminal equipped with a mode setting key for choosing an operating mode for the mobile terminal and a method of controlling the mobile terminal.

2. Description of the Related Art

Mobile terminals are portable devices capable of performing voice/video calls, inputting and outputting information, and/or storing data. As the functions of mobile terminals diversify, an increasing number of mobile terminals have been equipped with various complicated functions, such as capturing photos and moving images, playing music files and moving image files, providing games, receiving broadcast programs, and providing wireless Internet services, and have thus evolved into multifunctional multimedia players.

Various attempts have recently been made to implement a variety of complicated functions in mobile terminals such as providing a user interface environment for allowing users to search for and choose desired functions with ease. Further, mobile terminals are nowadays considered as personal belongings that represent users' personality, and thus, the demand for change in the design of mobile terminals has steadily grown.

Mobile terminals equipped with a mode setting key such as a three-way key or a jog dial may be placed in various operating modes or may execute any desired functions according to how the mode setting key is manipulated. The mode setting key enables a user to quickly execute any desired functions without the need to select menus and can thus improve user convenience.

Mobile terminals need to be set to a standby mode immediately after being booted. Conventionally, however, mobile terminals are automatically placed in an operating mode (if any) chosen by a mode setting key, instead of being placed in a standby mode, after being booted. Therefore, users may need to manually switch mobile terminals to a standby mode, thereby causing user inconvenience.

SUMMARY OF THE INVENTION

The present invention provides a mobile terminal which can be placed in an operating mode chosen by a mode setting key and is automatically placed in a standby mode, immediately after being booted, regardless of the chosen operating mode, and a method of controlling the operation of the mobile terminal.

According to an aspect of the present invention, there is provided a method of controlling a mobile terminal, the method including providing a mode setting key for choosing an operating mode for the mobile terminal; placing the mobile terminal in an operating mode chosen by the mode setting key when the mode setting key is manipulated; and placing the mobile terminal in a standby mode regardless of the chosen operating mode when the mobile terminal is booted.

According to another aspect of the present invention, there is provided a mobile terminal including a mode setting key configured to choose an operating mode for the mobile terminal; and a controller configured to place the mobile terminal in an operating mode chosen by the mode setting key when the mode setting key is manipulated, and to place the mobile terminal in a standby mode, regardless of the chosen operating mode, when the mobile terminal is booted.

According to another aspect of the present invention, there is provided a method of controlling a mobile terminal, the method including providing a mode setting key for choosing an operating mode and generating an input signal corresponding to an operating mode chosen by the mode setting key; choosing one of first and second subscriber authentication modules in response to the input signal; and making or receiving a call according to subscriber information present in the chosen subscriber authentication module upon receiving a request for a call.

According to another aspect of the present invention, there is provided a method of controlling a mobile terminal, the method including providing a mode setting key for choosing an operating mode; generating an input signal corresponding to an operating mode chosen by the mode setting key; and controlling a predetermined operation in response to the input signal.

According to another aspect of the present invention, there is provided a mobile terminal including first and second subscriber authentication modules; a mode setting key configured to generate an input signal corresponding to a chosen operating mode; an interface unit configured to provide an interface for transmitting data to or receiving data from one of the first and second subscriber authentication modules; and a controller configured to access the first and second subscriber authentication modules through the interface unit and thus to control a call to be made or received according to subscriber information present in whichever of the first and second subscriber authentication is accessed by the controller.

According to another aspect of the present invention, there is provided a mobile terminal including a mobile setting key configured to choose an operating mode and to generate an input signal corresponding to a chosen operating mode; and a controller configured to perform a predetermined operation in response to the input signal.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail in connection with specific embodiments with reference to the accompanying drawings.

The term 'mobile terminal', as used herein, may indicate a mobile phone, a smart phone, a laptop book computer, a digital broadcast receiver, a personal digital assistant (PDA), a portable multimedia player (PMP), or a navigation device.

Figure 1:
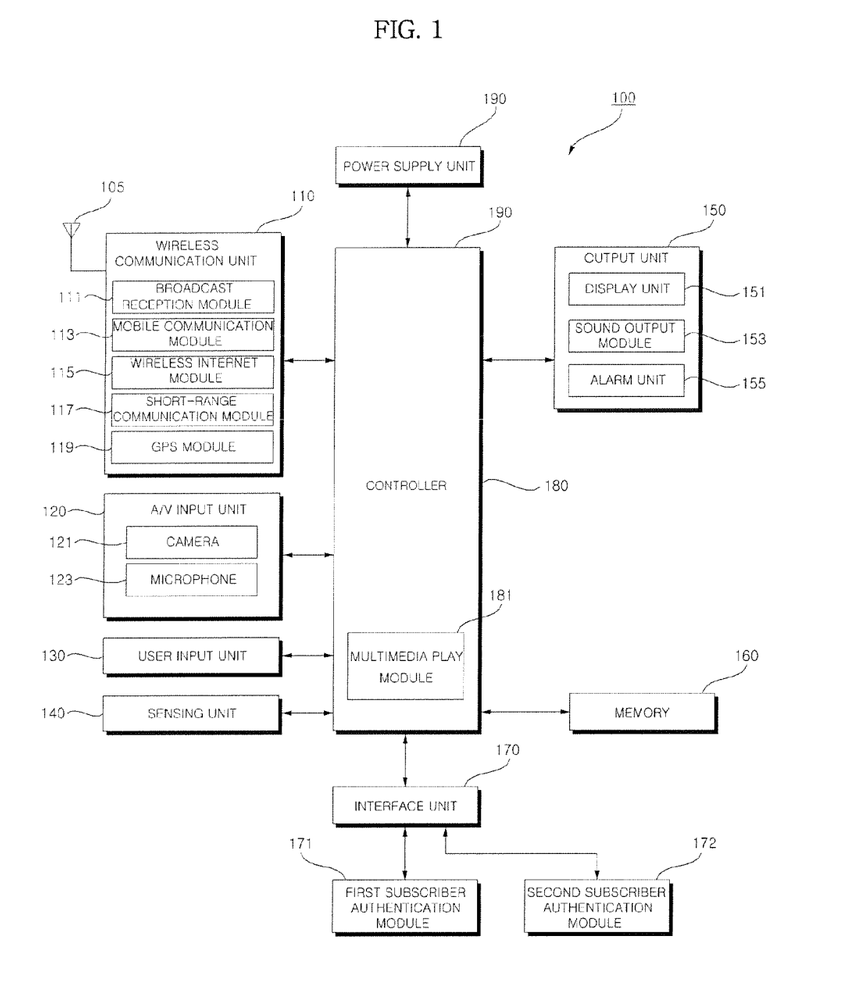
FIG. 1 illustrates a block diagram of a mobile terminal according to an embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Here, when the above constituent elements are implemented actually, two or more of the constituent elements may be combined into one constituent element or one constituent element may be divided into two or more constituent elements, if appropriate.

The wireless communication unit 110 may include a broadcast reception module 111, a mobile communication module 113, a wireless Internet module 115, a short-range communication module 117, and a global positioning system (GPS) module 119.

The broadcast reception module 111 receives broadcast signals and/or broadcast-related information from an external broadcast management server through a broadcast channel. The broadcast channel may include a satellite channel and a terrestrial channel. The broadcast management server may be a server which generates and transmits broadcast signals and broadcast-related information, or a server which receives and then transmits previously-generated broadcast signals and/or previously-generated broadcast-related information.

The broadcast-related information may include information regarding broadcast channels, broadcast programs and/or broadcasting service providers. Broadcast signals may include TV broadcast signals, radio broadcast signals, and data broadcast signals, and may also include broadcast signals obtained by combining which TV broadcast signals or radio broadcast signals with data broadcast signals. Broadcast-related information may be provided to the mobile terminal 100 through a mobile communication network. In this case, the broadcast-related information may be received by the mobile communication module 113. The broadcast-related information may exist in various forms. For example, the broadcast-related information may exist in the form of electronic program guide (EPG) of digital multimedia broadcasting (DMB) or electronic service guide (ESG) of digital video broadcast-handheld (DVB-H).

The broadcast reception module 111 may receive broadcast signals by using various broadcasting systems. More specifically, the broadcast reception module 111 may receive broadcast signals using a digital broadcasting system such as digital multimedia broadcasting-terrestrial (DMB-T), digital multimedia broadcasting-satellite (DMB-S), media forward link only (MediaFLO), DVB-H, or integrated services digital broadcast-terrestrial (ISDB-T). In addition, the broadcast reception module 111 may be suitable not only for the above-mentioned digital broadcasting systems but also for nearly all types of broadcasting systems for providing broadcast signals. Broadcast signals and/or broadcast-related information received by the broadcast reception module 111 may be stored in the memory 160.

The mobile communication module 113 transmits/receives radio signals to/from at least one of a base station, an external terminal, and a server through a mobile communication network. The radio signals may include various types of data according to whether the mobile terminal 100 transmits/receives voice call signals, video call signals, or text/multimedia messages.

The wireless Internet module 115 may be a module for wireless Internet access. The wireless Internet module 115 may be embedded in the mobile terminal 100 or may be installed in an external device. The short-range communication module 117 facilitates relatively short-range communications. Suitable technologies for implementing this module include radio frequency identification (RFID), infrared data association (IrDA), ultra-wideband (UWB), as well as at the networking technologies commonly referred to as Bluetooth and ZigBee, to name a few. The GPS module 119 may receive position information from a plurality of GPS satellites.

The A/V input unit 120 may be used to receive audio signals or video signals. The A/V input unit 120 may include a camera 121 and a microphone 123. The camera 121 processes image frames such as still images or moving images, which are obtained by an image sensor in a video call mode or an image capturing mode. The image frames processed by the camera 121 may be displayed on a display unit 151.

The image frames processed by the camera 121 may be stored in the memory 160 or may be transmitted outside the mobile terminal 100 through the wireless communication unit 110. The mobile terminal 100 may include two or more cameras 121.

The microphone 123 receives sound signals from outside the mobile terminal 100 in a call mode, a recording mode, or a voice recognition mode and converts the sound signals into electrical sound data. In the call mode, the mobile communication module 1130 may convert the electrical sound data so as to be able to be readily transmitted to a mobile communication base station and then output the converted electrical sound data. The microphone 123 may use various noise removal algorithms to remove noise that may be generated during the reception of sound signals from outside the mobile terminal 100.

The user input unit 130 generates key input data based on user input for controlling the operation of the mobile terminal 100. The user input unit 130 may include a keypad, a dome switch, a touch pad (either static pressure or constant electricity), a jog wheel, a jog switch, or a finger mouse. In particular, a mutual layer structure of the touch pad and the display unit 151 may be referred to as a touch screen.

The sensing unit 140 senses a current state of the mobile terminal 100, such as a closed state of the mobile terminal 100, the position of the mobile terminal 100, whether a user is touched, etc. and generates a sensing signal to control the operation of the mobile terminal 100. For example, when the mobile terminal 100 is a slide phone, the sensing unit 140 can sense whether the slide phone is opened or not. The sensing unit 140 also has a function of sensing whether power is supplied to the power supply unit 190, whether the interface unit 170 is connected to an external device, and so on.

The sensing unit 140 may include a proximity sensor 141. The proximity sensor 141 may detect an approaching object or whether objects exist nearby without mechanical contact. The proximity sensor 141 may detect adjacent objects by employing a change of AC magnetic field, a change of static magnetic field, or the rate of capacitance. Two or more proximity sensor 141 may be provided according to the aspect of a configuration.

The output unit 150 is configured to output audio signals, video signals and alarm signals, and may include the display unit 151, a sound output module 153, an alarm unit 155, and so on.

The display unit 151 displays thereon information processed in the mobile terminal 100. For example, when the mobile terminal is in the call mode, the display unit 151 can display user interface (UI) or graphic user interface (GUI) pertinent to a call. When the mobile terminal 100 is in the video call mode or capturing mode, the display unit 151 can display captured or received images thereon and can also display UI or GUI thereon.

Meanwhile, in the event that the display unit 151 and the touch pad form a layer structure in order to constitute a touch screen as described above, the display unit 151 may also be used as an input device as well as an output device. If the display unit 151 is a touch screen, the display unit 151 may include a touch screen panel and a touch screen panel controller. The touch screen panel may be a transparent panel attached to the exterior of the touch screen and may be connected to a bus in the mobile terminal 100. The touch screen panel monitors whether there is a touch input and transmits a number of signals corresponding to a touch input, if any. The touch screen panel controller processes the signals transmitted by the touch screen panel and transmits the processed signals to the controller 180. As a result, the controller 180 may be able to determine whether there has ever been a touch input and which part of the touch screen has been touched based on the processed signals provided by the touch screen panel controller.

Further, the display unit 151 may include at least one of a liquid crystal display, a thin film transistor-liquid crystal display, an organic light-emitting diode, a flexible display, and a 3D display. Two or more display units 151 may exist according to the type where the mobile terminal 100 is implemented. For example, the mobile terminal 100 can be equipped with an external display unit (not shown) and an internal display unit (not shown) at the same time.

The sound output module 153 outputs audio data, which is received from the wireless communication unit 110 in an incoming call mode, a call mode, a record mode, a voice recognition mode, an incoming broadcasting mode, and so on, or stored in the memory 160. The sound output module 153 also outputs sound signals pertinent to functions, such as sound of an incoming call signal and sound of an incoming message, which are performed in the mobile terminal 100. The sound output module 153 may include a speaker and a buzzer.

The alarm unit 155 outputs signals to inform events generated in the mobile terminal 100. For example, the events occurring in the mobile terminal 100 can include a received call signal, a received message, and a key signal input. The alarm unit 155 can also output signals to inform the occurrence of events in different ways in addition to the audio signals or the video signals. For example, the alarm unit 155 can output signals in vibration form. When a call signal is received or a message is received, the alarm unit 155 can output vibration in order to inform the reception of the call signal or message. Alternatively, when a key signal is input, the alarm unit 155 can output vibration as a feedback to the input key signal. A user can notice the occurrence of an event through this vibration. It is to be understood that the signals to inform the occurrence of events can also be output through the display unit 151 and/or the sound output module 153.

The memory 160 can store programs necessary to process and control the controller 180 and also temporarily store input or output data (for example, a phonebook, a message, a still image, and a moving image).

The memory 160 may include a storage medium, such as a flash memory type, a hard disk type, a multimedia card micro type, memory of a card type (for example SD or XD memory, and so on), RAM, and ROM. The mobile terminal 100 can also manage a web storage that performs the storage function of the memory 160 on the Internet.

The interface unit 170 functions as an interface with all external devices connected to the mobile terminal 100. For example, the external devices connected to the mobile terminal 100 can include wired/wireless headsets, an external charger, wired/wireless data ports, a memory card, a card socket such as subscriber identification module (SIM)/user identity module (UIM) cards, an audio input/output (I/O) terminal, a video I/O terminal, an earphone, and so on. The interface unit 170 can receive data from the external devices, can be supplied with power, can transfer the received data to respective constituent elements within the mobile terminal 100, and can transmit data within the mobile terminal 100 to the external devices.

First and second subscriber authentication modules 171 and 173 store subscriber information, phone number information, and charge information for each available call time. The first and second subscriber authentication modules 171 and 173 may be subscriber identity module (SIM) cards, user identity module (UIM) cards or user subscriber identity module (USIM) cards.

SIM cards are small-sized printed circuit boards, which are commonly inserted into Global System for Mobile Communications (GSM) mobile communication terminals when applying for subscription. A SIM card may include a memory, which stores detailed subscriber information, security information and personal phone number information and a microchip, which stores information and encrypts voice data or other data. A SIM card may store data necessary for identifying callers for network service providers.

USIM cards and UIM cards provide almost the same functions as those of SIM cards but are different from SIM cards in terms of the types of encryption technology and short messaging service (SMS) technology that they use and a logical layer structure that they adopt. The interface unit 170 may provide an interface for the transmission/reception of data with the aid of one of the first and second subscriber authentication modules 171 and 173.

The controller 180 generally controls the operation of each element in order to control an overall operation of the mobile terminal 100. For example, the controller 180 can perform pertinent controls and processes for voice call, data communication, video call, and so on. The controller 180 can be equipped with a multimedia play module 181 for playing multimedia. The multimedia play module 181 may be constructed in hardware within the controller 180 or in software separately from the controller 180.

The power supply unit 190 is supplied with external power source or internal power source, and supplies power source necessary for the operation of each constituent element to the constituent elements under the control of the controller 180.

The mobile terminal pertinent to the present invention has been described so far from a viewpoint of the constituent elements according to their functions. Hereinafter, the mobile terminal related to the present invention is described from a viewpoint of the constituent elements according to their external forms with reference to FIGS. 2 and 3. Of several types of mobile terminals including the folding type, the bar type, the swing type, and the sliding type, the sliding type mobile terminal equipped with a full touch screen is now described as an example for convenience of description. However, it is to be understood that the present invention is not limited to the sliding type mobile terminal, but instead can be applied to all types of mobile terminals including the above types.

Figure 2:
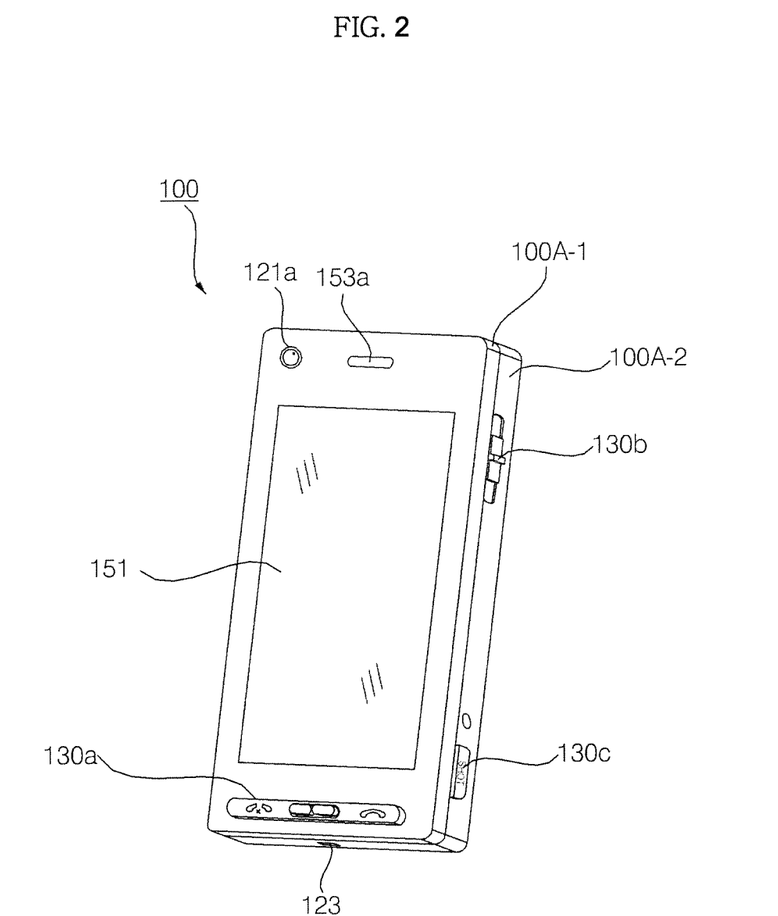
FIG. 2 illustrates a front perspective view of the mobile terminal illustrated in FIG. 1.

FIG. 2 illustrates a front perspective view of the mobile terminal 100. Referring to FIG. 2, the mobile terminal 100 includes a front case 100A-1 and a rear case 100A-2. The front and rear cases 100A-1 and 100A-2 define the exterior of the mobile terminal 100. Various electronic components are installed in the space between the front and rear cases 100A-1 and 100A-2. At least one intermediate case may be disposed between the front case 100A-1 and the rear case 100A-2. The front and rear cases 100A-1 and 100A-2 and the intermediate case(s) may be formed by injecting synthetic resin or may be formed of a metal such as stainless steel (STS) or titanium (Ti).

The display unit 151, a first sound output module 153a, a first camera 121a, and a first user input unit 130a may be disposed in the front case 100A-1. A second user input unit 130b, a third user input unit 130c, and the microphone 123 may be disposed on lateral surfaces of the rear case 100A-2.

The display unit 151 may include a liquid crystal display (LCD) or an organic light-emitting diode (OLED) which visually renders information. A touch pad may be laid over the display unit 151 as a layer, and thus, the display unit 151 may serve as a touch screen and allow a user to touch the touch pad and thus to input information.

The first sound output module 153a may be implemented as a receiver or speaker. The first camera 121a may be configured to capture a still image or a moving image of a user. The microphone 123 may be configured to receive the voice of a user or other sounds.

The first through third user input units 130a through 130c may be collectively referred to as the user input unit 130. The user input unit 130 may adopt various methods as long as they can offer tactile feedback to a user.

For example, the user input unit 130 may be implemented as a dome switch or a touch pad which receives a command or information upon being pushed or touched by a user. Alternatively, the user input unit 130 may be implemented as a wheel, jog dial, or a joystick the first user input unit 130a may receive commands such as 'start', 'end'. 'send'. The second user input unit 130b may be used as a mode setting key for choosing an operating mode for the mobile terminal 100. The third user input unit 130c may be used as a hot key for activating a predetermined function of the mobile terminal 100.

Figure 3:
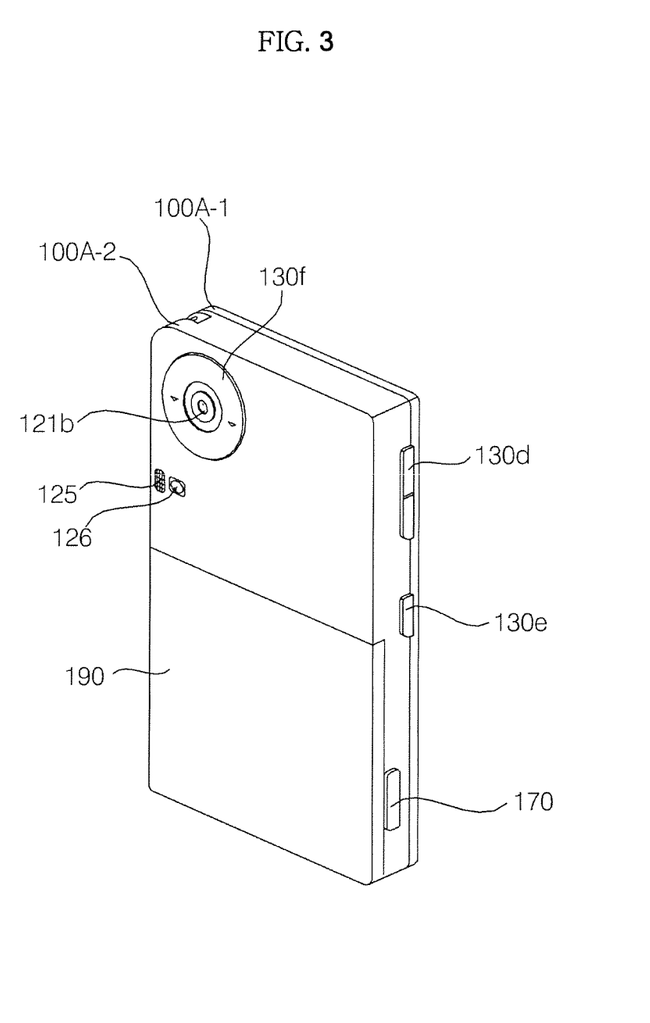
FIG. 3 illustrates a rear perspective view of the mobile terminal illustrated in FIG. 1.

FIG. 3 illustrates a rear perspective view of the mobile terminal 100. Referring to FIG. 3, a fourth user input unit 130d, a fifth user input unit 130e, and the interface unit 170 may be disposed on lateral surfaces of the rear case 100A-2. Second camera 121b may be additionally mounted on the rear surface of the. The second camera 121b has a photographing direction, which is substantially opposite to that of the first camera 121a, and may have different pixels from that of the first camera 121a. For example, the first camera 121a may have low pixels sufficiently enough to photograph a user's face and send the photographed face to a counterpart in a video call. The second camera 121b may have high pixels because photographed subjects are not transmitted immediately after the photographing.

A flash 125 and a mirror (not shown) can be further disposed adjacent to the second camera 121b. The flash 125 is configured to illuminate a subject when the subject is photographed using the second camera 121b. The mirror is configured to reflect a user when the user has his face, etc. photographed (self-photographing) using the second camera 121b.

A second sound output module (not shown) may be further disposed in the second rear casing 100B-2. The second sound output module can realize a stereo function together with the first sound output module 153a and can also be used for a call in the speakerphone mode.

An antenna (not shown) for receiving broadcast signals as well as an antenna for a call, and so on may be disposed on one side of the second rear casing 100B-2. The antenna 105 can be drawn out from the second body 100B. A part of a sliding module that slidingly couples the first body 100A and the second body 100B can be disposed on the part of the first rear casing 100A-2 of the first body 100A. The other part of the sliding module can be disposed on the part of the second front casing 100B-1 of the second body 100B, so it may not be exposed to the outside, as shown in FIG. 3.

It has been described above that the second camera 121b is disposed in the second body 100B. However, the present invention is not limited to this. For example, one or more of the constituent elements, which are disposed in the second rear casing 100B-2 together with the second camera 121b, etc., may be disposed in the first body 100A, mainly, in the first rear casing 100A-2. Hence, there is an advantage in that the constituent elements disposed in the first rear casing 100A-2 are protected by the second body 100B in the closed configuration. Further, although the second camera 121b is not separately included, the first camera 121a may be disposed rotatably in such a way to photograph even the photographing direction of the second camera 121b.

The power supply unit 190 for supplying power source to the mobile terminal is disposed on the part of the second rear casing 100B-2. The power supply unit 190 may be, for example, a rechargeable battery, and can be detachably attached to the rear casing 100A-2 for recharging, and so on.

The second camera 121b is illustrated in FIG. 3 as being disposed on the rear casing 100A-2, but the present invention is not limited to this.

Figure 4:
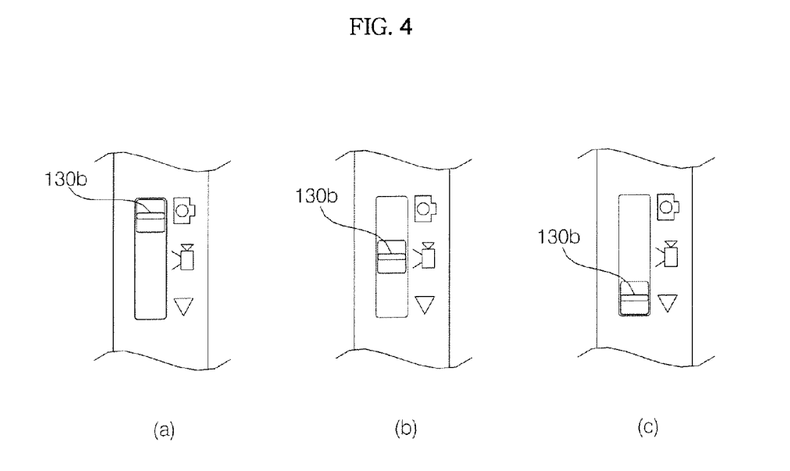
FIG. 4 illustrates diagrams for explaining the functions of a second user input unit of the mobile terminal illustrated in FIG. 1.

FIG. 4 illustrates diagrams for explaining the functions of the second user input unit 130b. Referring to FIG. 4, the second user input unit 130b may be a three-way key. Alternatively, the second user input unit 130b may be a jog dial. The second user input unit 130b may be used as a mode setting key for choosing an operating mode or an operating environment for the mobile terminal 100. That is, the mobile terminal 100 may be set to a predetermined operating mode or a predetermined operating environment by the second user input unit 130b.

More specifically, FIG. 4(*a*) illustrates the situation when the mobile terminal 100 is set to a camera mode, FIG. 4(*b*) illustrates the situation when the mobile terminal 100 is set to a moving image mode, and FIG. 4(*c*) illustrates the situation when the mobile terminal 100 is set to a play mode for playing multimedia files.

The mobile terminal 100 may be readily placed in one of the camera mode, the moving image mode, and the play mode by the second user input unit 130b, and thus, the second user input unit 130b may serve as a hot key for placing the mobile terminal 100 in a predetermined operating mode.

Figure 5:
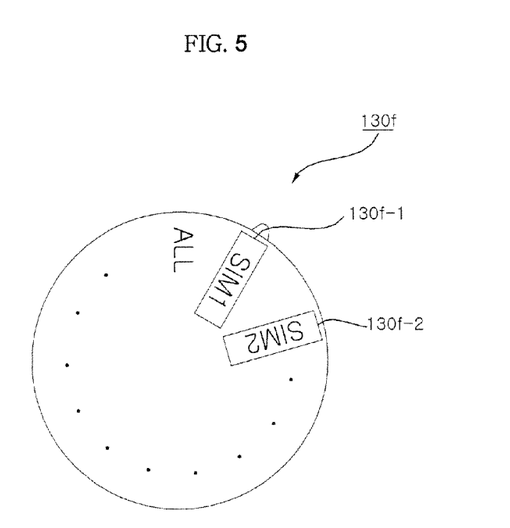
FIGS. 5 and 6 illustrate diagrams for explaining the functions of a sixth user input unit of the mobile terminal illustrated in FIG. 1.
Figure 6:
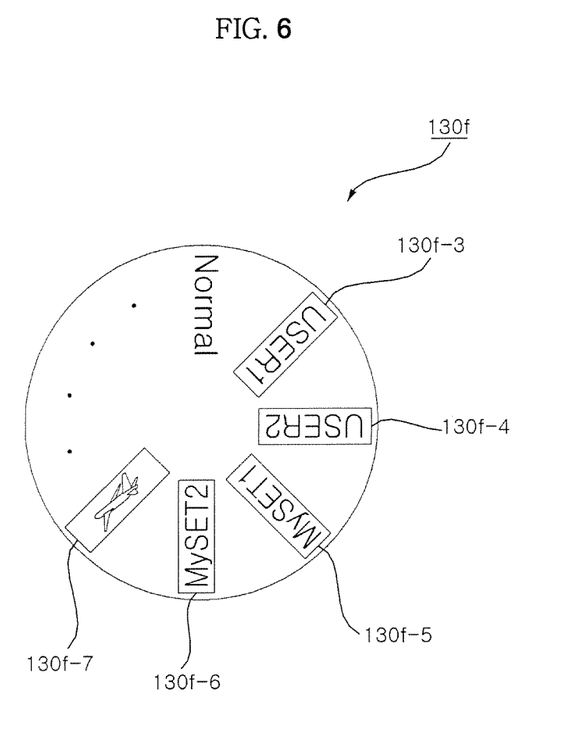

FIGS. 5 and 6 illustrate diagrams for explaining the functions of the sixth user input unit 130*f*. Referring to FIGS. 5 and 6, one of a plurality of operating modes may be chosen by rotating the sixth user input unit 130*f* in the same manner used to manipulate a jog dial. More specifically, FIG. 5 illustrates the situation when one of a plurality of subscriber authentication modules of a mobile terminal is chosen by the sixth user input unit 130*f* and a desired operation is performed using the chosen subscriber authentication module. For example, if the mobile terminal is equipped with a plurality of subscriber authentication modules to which different phone numbers are allocated, a call may be made using subscriber information present in one of the subscriber authentication modules according to one of a plurality of operating modes 130*f*-1 and 130*f*-2 chosen by the sixth user input unit 130*f*. Therefore, a user may be able to easily choose a phone number to be used according to time and place with the aid of the sixth user input unit 130*f*.

FIG. 6 illustrates a diagram for explaining how to choose one of a plurality of operating modes 130*f*-3 and 130*f*-4, which are set by a user, with the use of the sixth user input unit 130*f* and how to choose one of a flying mode 130*f*-7 and a plurality of operating environments 130*f*-5 and 130*f*-6, which are set by the user, with the use of the sixth user input unit 130*f*. Referring to FIG. 6, even when performing an operation, the mobile terminal 100 may be readily placed in an operating mode or an operating environment chosen by the sixth user input unit 130*f*.

A number of operating modes may be set in the sixth user input unit 130*f*. Then, one of the operating modes may be chosen by rotating the sixth user input unit 130*f*. One of the operating modes described above with reference to FIGS. 5 and 6 may be set in the sixth user input unit 130*f*. In this case, if none of the first and second subscriber authentication modules 171 and 173 of the mobile terminal 100 are chosen, whichever of the first and second subscriber authentication modules 171 and 173 is set as a default subscriber authentication module may be used. The sixth user input unit 130*f* may be optional. In this case, the second user input unit 130*b* may perform the functions of the sixth user input unit 130*f*.

Figure 7:
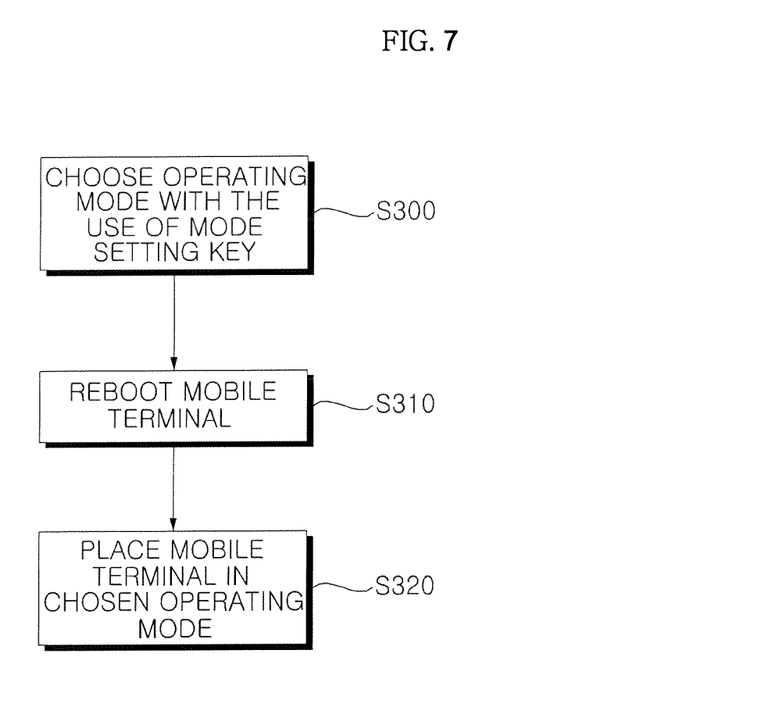
FIGS. 7 and 8 illustrates a flowchart of a method of controlling the operation of a mobile terminal according to an embodiment of the present invention.
Figure 8:
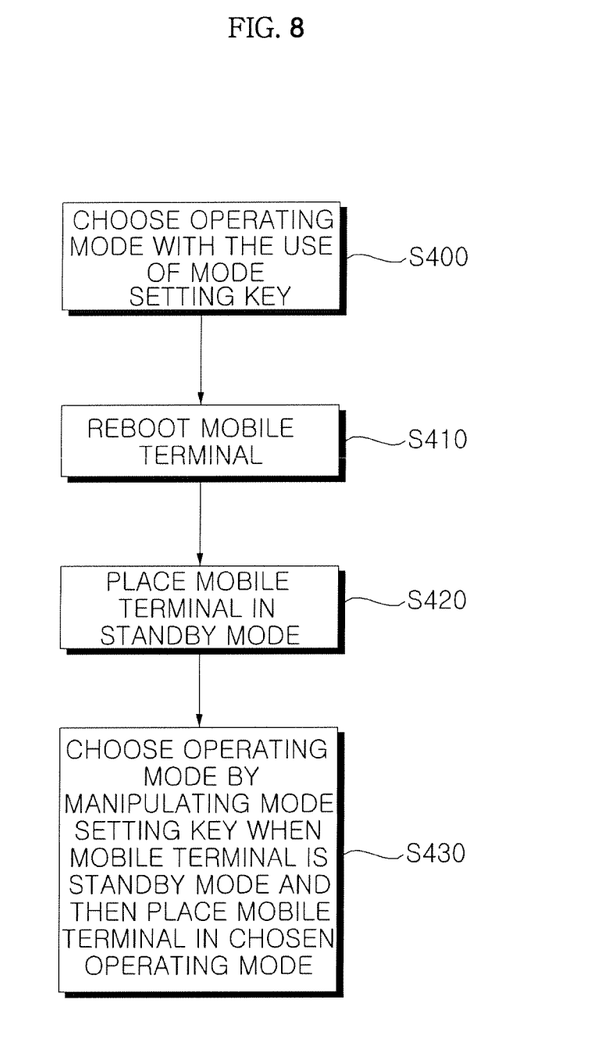

FIG. 7 illustrates a flowchart of a conventional method of controlling a mobile terminal, and FIG. 8 illustrates a flowchart of a method of controlling a mobile terminal according to an embodiment of the present invention.

Referring to FIG. 7, a predetermined operating mode is chosen for a mobile terminal by manipulating a mode setting key (S200). Then, the mobile terminal is placed in the predetermined operating mode and performs an operation corresponding to the predetermined operating mode. Thereafter, if the mobile terminal is rebooted (S210), the mobile terminal is automatically placed again in the predetermined operating mode (S220). For example, if the mobile terminal is set to a moving image mode and is then rebooted, the mobile terminal may be automatically placed again in the moving image mode.

Referring to FIG. 8, a predetermined operating mode is chosen for the mobile terminal 100 by manipulating a mode setting key such as the second user input unit 130*b* or the sixth user input unit 130*f* (S300). Then, the mobile terminal 100 is placed in the predetermined operating mode and performs an operation corresponding to the predetermined operating mode. Thereafter, if the mobile terminal 100 is rebooted (S310), the mobile terminal 100 is automatically placed in a standby mode (S320) even though the mobile terminal 100 is set to the predetermined operating mode by the mode setting key. Thereafter, if the mode setting key is manipulated and thus the predetermined operating mode or another operating mode is chosen for the mobile terminal, the mobile terminal 100 may be switched from the standby mode to the chosen operating mode (S330).

In short, the mobile terminal 100 may be automatically placed in a standby mode whenever being powered on or booted, regardless of an operating mode chosen by a mode setting key. The method illustrated in FIG. 8 may be used along with the conventional method illustrated in FIG. 7. In this case, a menu for choosing whether to automatically place the mobile terminal 100 in a standby mode or an operating mode chosen by a mode setting key after turning on the mobile terminal 100 may be additionally provided.

Figure 9:
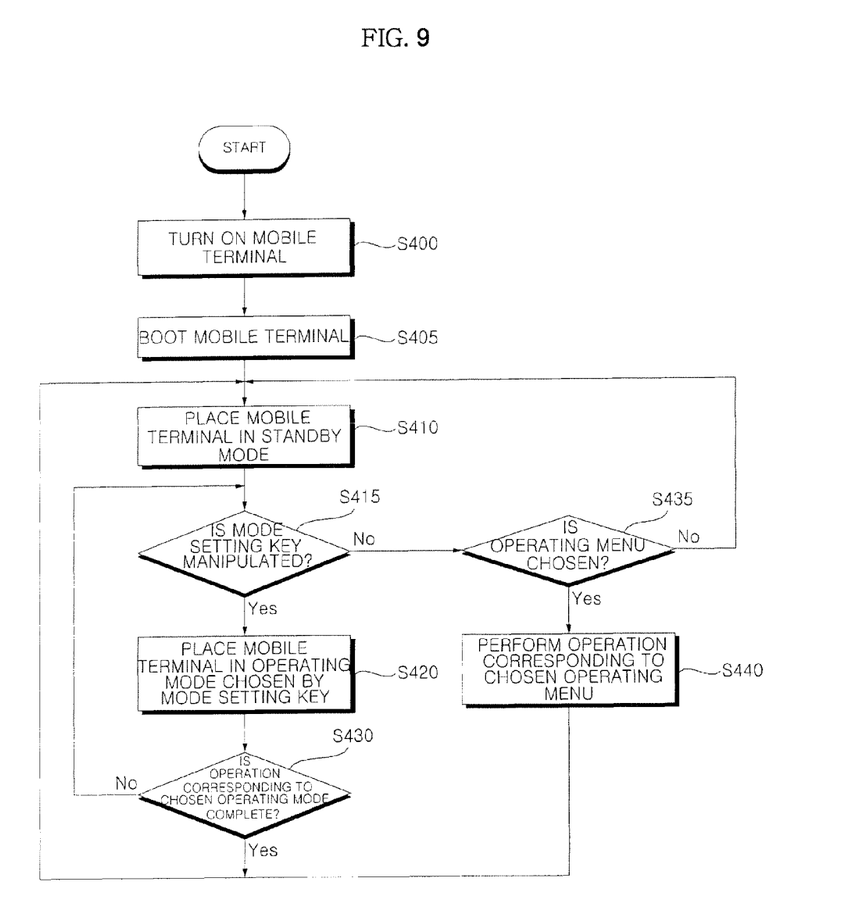
FIG. 9 illustrates a detailed flowchart of the method of the embodiment of FIG. 8.

FIG. 9 illustrates a detailed flowchart of the method illustrated in FIG. 8. Referring to FIG. 9, when the mobile terminal 100 is powered on by pressing a key of the user input unit 130 for turning on the mobile terminal 100 (S400), the controller 180 performs a booting operation using a booting program present in the memory 160 (S405). More specifically, the controller 180 may perform a booting operation using a similar method to that used in a typical embedded system.

Once the booting operation performed in operation S405 is complete, the controller 180 controls the display unit 151 to display an idle screen, and the mobile terminal 100 is placed in a standby mode (S410). Then, the display unit 151 is placed in a blank-screen mode for the purpose of energy conservation. If a key input is made through the user input unit 130, the display unit 151 may be switched back to a normal display mode and may thus display an idle screen.

If a mode setting key is manipulated and thus a predetermined operating mode is set for the mobile terminal 100 (S415), the controller 180 may place the mobile terminal 100 in the predetermined operating mode (S420). In short, immediately after being booted, the mobile terminal 100 may be automatically placed in a standby mode regardless of an operating mode chosen by a mode setting key. Then, if the mode setting key is manipulated when the mobile terminal 100 is still in the standby mode, the mobile terminal 100 may be placed in the operating mode chosen by the mode setting key. A camera mode, a moving image mode and a play mode may be provided as operating modes for the mobile terminal 100. Once the mobile terminal 100 is placed in the operating mode chosen by the mode setting key, the mobile terminal 100 performs an operation corresponding to the operating mode chosen by the mode setting key.

If the operation corresponding to the operating mode chosen by the mode setting key is complete (S425), the method returns to operation S410.

If an operation menu is chosen, instead of manipulating the mode setting key (S430), the controller 180 may control an operation corresponding to the chosen operation menu to be performed (S435), and the method returns to operation S410.

In the embodiment of FIG. 9, the mobile terminal 100 may be able to be placed in an operating mode chosen by a mode setting key if the mode setting key is manipulated. However, the mobile terminal 100 may be automatically placed in a standby mode immediately after being booted, regardless of the operating mode chosen by the mode setting key.

Figure 10:
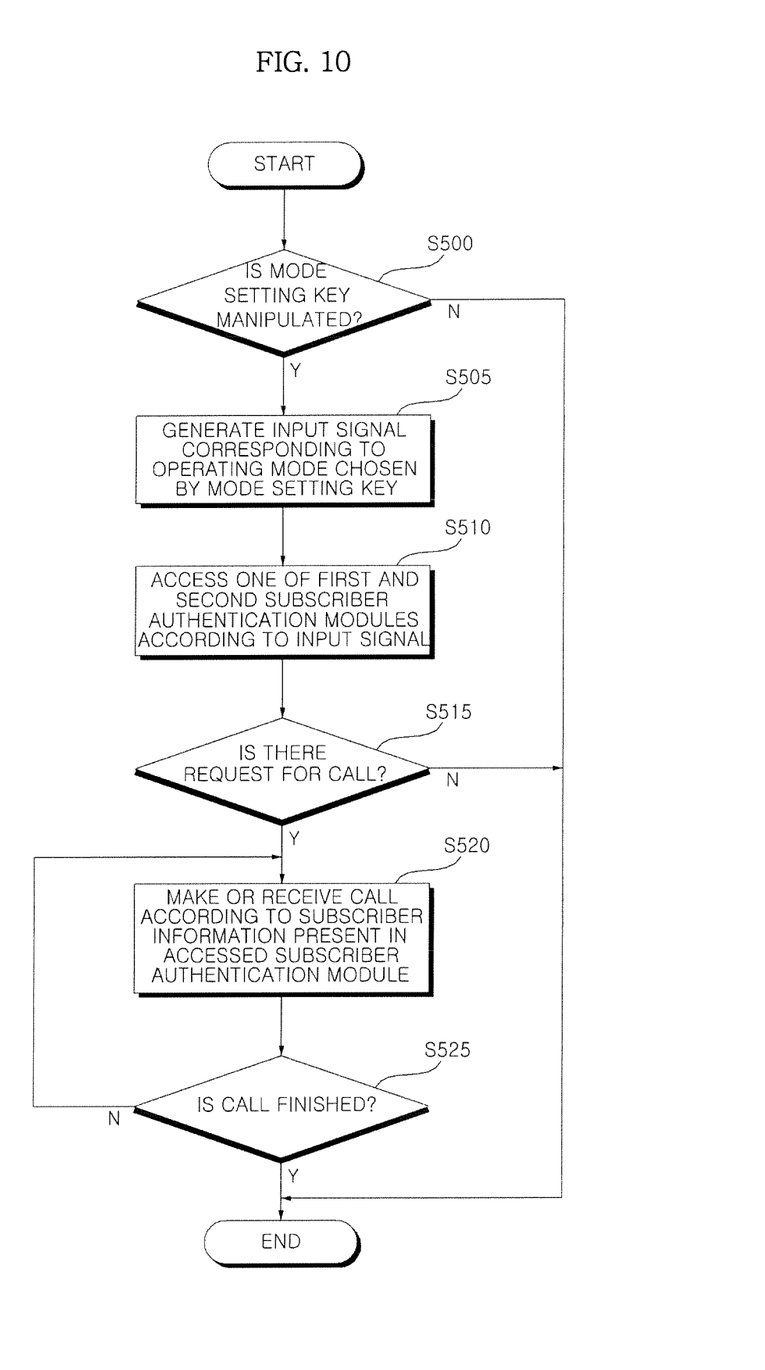
FIG. 10 illustrates a flowchart of a method of controlling the operation of a mobile terminal according to another embodiment of the present invention.

FIG. 10 illustrates a flowchart of a method of controlling a mobile terminal according to another embodiment of the present invention. Referring to FIG. 10, one of a plurality of operating modes is chosen by manipulating a mode setting key such as the second user input unit 130*b* or the sixth user input unit 130*f* (S500). Then, the mode setting key generates an input mode corresponding to the chosen operating mode (S505). The controller 180 controls the interface unit 170 to transmit data to or receive data from one of the first and second subscriber authentication modules 171 and 173 according to the input signal generated by the mode setting key.

If the phone number of another mobile terminal is received and a request for a call is issued by pressing a shortcut key for making a call (S515), the controller 180 may make or receive a call according to subscriber information present in whichever of the first and second subscriber authentication modules 171 and 173 is connected to the interface unit 170 (S520). Then, if the call is finished (S525), the method ends.

By using the method illustrated in FIG. 10, it is possible to switch between the phone numbers respectively allocated to the first and second subscriber authentication modules 171 and 173 by manipulating a mode setting key such as the second user input unit 130*b* or the sixth user input unit 130*f*.

The method illustrated in FIG. 10 has been described above, taking as an example the situation when the mobile terminal 100 is equipped with two subscriber authentication modules, but the present invention is not restricted to this. That is, even when the mobile terminal 100 is equipped with two or more subscriber authentication modules, it is possible to choose one of the subscriber authentication modules by manipulating a mode setting key such as the second user input unit 130*b* or the sixth user input unit 130*f* using the method illustrated in FIG. 10.

Figure 11:
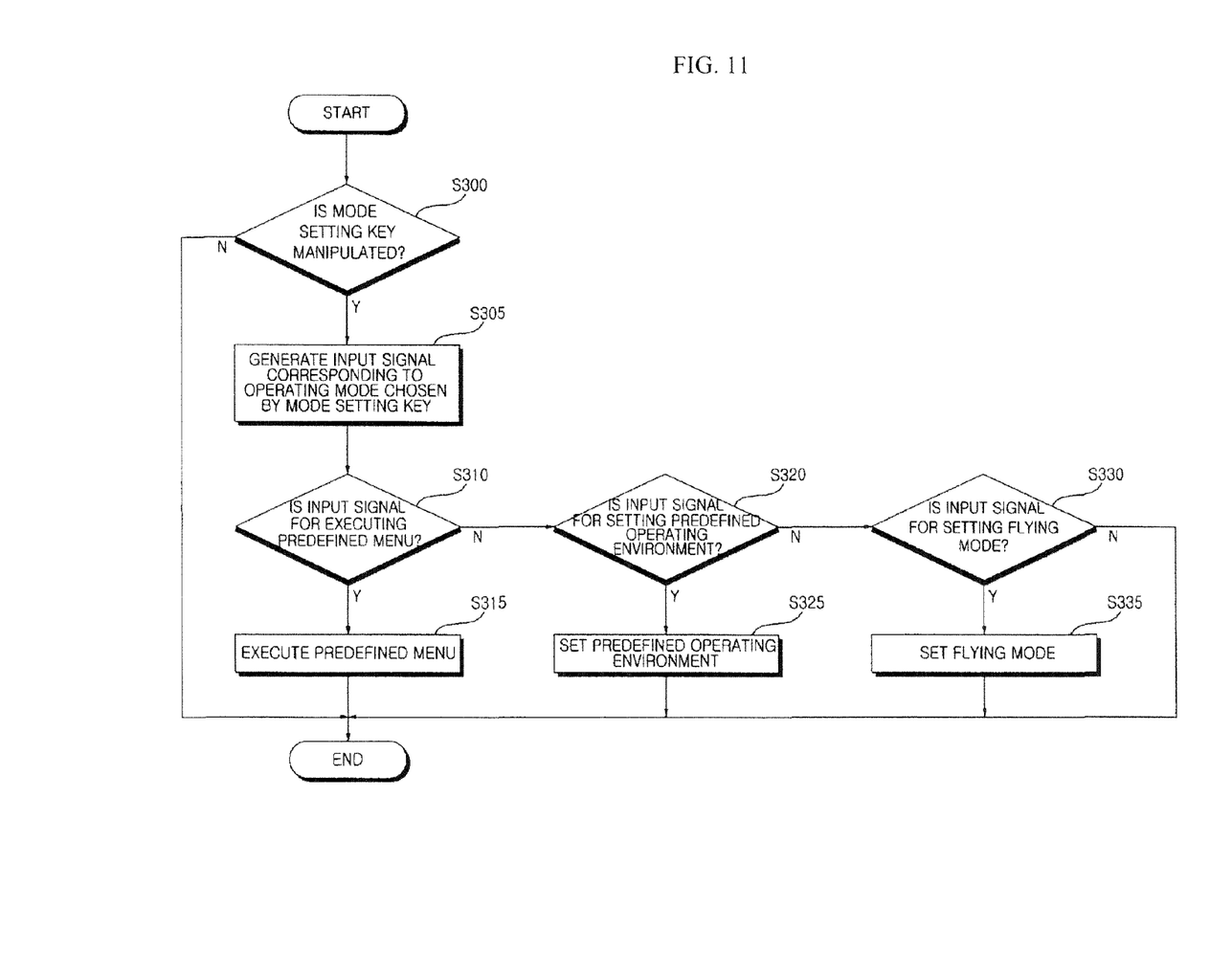
FIG. 11 illustrates a flowchart of a method of controlling the operation of a mobile terminal according to another embodiment of the present invention.

FIG. 11 illustrates a flowchart of a method of controlling a mobile terminal according to another embodiment of the present invention. It will hereinafter be described how to execute a predefined menu or set an operating environment using a mode setting key.

Referring to FIGS. 7 and 11, when a mode setting key such as the second user input unit 130*b* or the sixth user input unit 130*f* is driven (S600), the mode setting key generates an input signal corresponding to a chosen operating mode (S605). Then, the controller 180 controls an operation corresponding to the input signal to be performed.

That is, if the input signal is a signal for executing a predefined menu (S610), the controller 190 controls the predefined menu to be executed in response to the input signal (S615). The predefined menu may be a menu chosen by a user or a menu set as a default during the manufacture of the mobile terminal 100. Even when the mobile terminal 100 performs its function, the predefined menu may be readily executed in response to the input signal.

If the input signal is a signal for setting a predefined operating environment (S620), the controller 180 controls the predefined operating environment to be set in response to the input signal (S625). Examples of the setting of the predefined operating environment include setting a channel or volume when the user chooses to watch a digital multimedia broadcasting (DMB) program and setting a set of photographing conditions when the mobile terminal 100 is set to a camera mode.

If the input signal is a signal for setting a flying mode (S630), the controller 180 controls the flying mode to be set (S635). In the flying mode, the mobile terminal 100 is turned on but does not perform any communication-related functions such as phone, SMS and Internet functions. Since the mobile terminal 100 does not perform any communication-related functions but performs additional functions such as the functions of an MP3 player, a camera or an alarm clock when being in the flying mode, the flying mode may be used in airplanes or public places. In general, if the mobile terminal 100 is placed in the flying mode and then is released from the flying mode when neither an alarm function nor a morning call function is set in the mobile terminal 100, the mobile terminal 100 may be rebooted.

As described above, in the embodiment of FIG. 11, it is possible to easily execute a menu desired by a user or quickly set a necessary operating environment for the mobile terminal 100 by manipulating a mode setting key such as a three-way key or a jog dial.

In the embodiment of FIG. 11, once the mobile terminal 100 is booted, the mobile terminal 100 is automatically placed in a standby mode regardless of an operating environment set by a mode setting key. Alternatively, a user may be allowed to choose whether to place the mobile terminal 100 in the standby mode when being booted regardless of an operating environment set by a mode setting key or to place the mobile terminal 100 in the operating environment or an operating mode chosen by the mode setting key when being booted.

The present invention is not restricted to the above-mentioned embodiments. In addition, the combination of all or some of the above-mentioned embodiments is also within the scope of the present invention.

Meanwhile, the present invention may be implemented in a recording medium in which a code readable by a processor included in a mobile terminal, such as a mobile station modem (MSM) is implemented. The processor-readable recording media may include all kinds of recording devices in which data, which can be readable by a processor, is stored. For example, the processor-readable recording media may include ROM, RAM, CD-ROM, magnetic tapes, floppy disks, optical data storages, and so on, and also include the form of carrier waves, such as transmission over the Internet. Further, the processor-readable recording media may be distributed into computer systems connected over a network, and a processor-readable code may be stored and executed in a distributed manner.

As described above, according to the present invention, it is possible to quickly place a mobile terminal in a predetermined operating mode by using a three-way key or a jog dial as a mode setting key. In addition, it is possible to place a mobile terminal in a standby mode when being booted, regardless of an operating mode currently being chosen by a mode setting key. Therefore, since there is no need for a user to switch a mobile terminal to a standby mode after booting the mobile terminal, it is possible to improve user convenience.

According to the present invention, it is possible to choose one of a plurality of subscriber authentication modules of a mobile terminal by using a mode setting key. In addition, it is possible to perform various control operations such as executing a menu chosen by a user or setting an operating environment desired by the user by using a mode setting key. Therefore, it is possible to quickly and efficiently control a mobile terminal having a limited size using a mode setting key and thus to further improve user convenience.

As described above, according to the present invention, the play speed of a moving image displayed on the display unit can be controlled according to a proximity signal detected by the proximity sensor. A variety of operations, such as screen capturing, can be controlled in conjunction with a touch input. Accordingly, a user can control the operation of a mobile terminal conveniently through an operation of approaching his finger to a screen and touching the screen, instead of selecting menus pertinent to screen control and executing the selected menus.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a mobile terminal, the method comprising:
   receiving input via a first mode setting device for choosing a first operating mode of the mobile terminal;
   placing the mobile terminal in the first operating mode in response to the input received via the first mode setting device, wherein the first operating mode is any mode of a selectable plurality of modes comprising a camera mode, a moving image mode, or a play mode;
   receiving input via a second mode setting device for choosing a second operating mode of the mobile terminal;
   placing the mobile terminal in the second operating mode in response to the input received via the second mode setting device, wherein the second operating mode comprises an operation mode for selecting one of a plurality of subscriber authentication modules in response to the input received via the second mode setting device and performing a call operation according to subscriber information present in the selected one of the plurality of subscriber authentication modules;
   receiving further input, via a selection menu, for placing the mobile terminal in either a standby mode or a previous operating mode when the mobile terminal is rebooted, wherein the standby mode comprises a state in which the mobile terminal displays an idle screen on a display, and wherein the previous operating mode is the first operating mode that the mobile terminal is placed in responsive to the input received via the first mode setting device;
   rebooting the mobile terminal after the further input is received via the selection menu;
   placing the rebooted mobile terminal into the standby mode when the further input is for placing the mobile terminal in the standby mode regardless of the previous operating mode; and
   placing the rebooted mobile terminal into the previous operating mode when the further input is for placing the mobile terminal in the previous operating mode.

2. The method of claim 1, wherein the second mode setting device comprises a three-way key or a rotatable jog dial.

3. The method of claim 1, wherein if the mobile terminal is placed in the standby mode when rebooted, the method further comprises:
   receiving the input via the second mode setting device for choosing the second operating mode for the mobile terminal while the mobile terminal is in the standby mode; and
   performing an operation corresponding to the second operating mode in response to the input received via the second mode setting device.

4. The method of claim 1, further comprising executing a predefined menu based on the first operating mode.

5. The method of claim 4, further comprising receiving a command to set the predefined menu.

6. The method of claim 1, further comprising receiving input via the second mode setting device for setting an operating environment of the mobile terminal.

7. A mobile terminal comprising:
   a first mode setting device configured to receive input for choosing a first operating mode of the mobile terminal;
   a second mode setting device configured to receive input for choosing a second operating mode of the mobile terminal;
   a display configured to display a selection menu for receiving further input for placing the mobile terminal in either in a standby mode or a previous operating mode when the mobile terminal is rebooted, wherein the standby mode comprises a state in which the mobile terminal displays an idle screen on the display, and wherein the previous operating mode is the first operating mode that the mobile terminal is placed in responsive to the input received via the first mode setting device;
   a controller configured to:
      place the mobile terminal in the first operating mode in response to the input received via the first mode setting device, wherein the first operating mode is any mode of a selectable plurality of modes comprising a camera mode, a moving image mode, or a play mode;
      place the mobile terminal in the second operating mode in response to the input received via the second mode setting device, wherein the second operating mode comprises an operation mode that selects one of a plurality of subscriber authentication modules and perform a call operation according to subscriber information present in the selected one of the plurality of subscriber authentication modules;
      place the mobile terminal into the standby mode when the mobile terminal is rebooted and when the further input is for placing the mobile terminal in the standby mode regardless of the previous operating mode; and
      place the mobile terminal into the previous operating mode when the mobile terminal is rebooted and when the further input is for placing the mobile terminal in the previous operating mode.

8. The mobile terminal of claim 7, wherein the second mode setting device is a three-way key or a rotatable jog dial.

9. The mobile terminal of claim 8, wherein the second mode setting device is further configured to receive the input via the second mode setting device for choosing the second operating mode for the mobile terminal while the mobile terminal is in the standby mode.

10. The mobile terminal of claim 7, wherein the controller is further configured to execute a predefined menu based on the first operating mode.

11. The mobile terminal of claim 10, wherein the controller is further configured to set the predefined menu in response to a received command.

12. The mobile terminal of claim 7, wherein:
   the second mode setting device is further configured to receive input for setting an operating environment of the mobile terminal; and
   the controller is further configured to set the operating environment of the mobile terminal in response to the input received via the second mode setting device.

* * * * *